(12) United States Patent
Tanizawa

(10) Patent No.: US 10,630,464 B2
(45) Date of Patent: Apr. 21, 2020

(54) COMMUNICATION DEVICE, COMMUNICATION SYSTEM, AND COMMUNICATION METHOD ALLOCATING SHARED KEYS TO PLURAL CHANNELS

(71) Applicant: Kabushiki Kaisha Toshiba, Minato-ku (JP)

(72) Inventor: Yoshimichi Tanizawa, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 194 days.

(21) Appl. No.: 15/437,542

(22) Filed: Feb. 21, 2017

(65) Prior Publication Data
US 2018/0062836 A1    Mar. 1, 2018

(30) Foreign Application Priority Data
Aug. 26, 2016 (JP) ................. 2016-165650

(51) Int. Cl.
*H04L 29/06* (2006.01)
*H04L 9/08* (2006.01)
*H04L 9/14* (2006.01)

(52) U.S. Cl.
CPC .......... *H04L 9/0822* (2013.01); *H04L 9/0852* (2013.01); *H04L 9/0869* (2013.01);
(Continued)

(58) Field of Classification Search
CPC ... H04L 9/0822; H04L 9/0825; H04L 9/0852; H04L 9/0891; H04L 9/0894; H04L 9/14
See application file for complete search history.

(56) References Cited

U.S. PATENT DOCUMENTS

| 7,646,873 B2 * | 1/2010 | Lee ........................ H04L 9/0852 380/277 |
| 9,160,529 B2 * | 10/2015 | Tajima ................... H04L 9/0891 |

(Continued)

FOREIGN PATENT DOCUMENTS

| CN | 105357001 B  * | 8/2018 |
| JP | 4015385 | 11/2007 |

(Continued)

*Primary Examiner* — Shewaye Gelagay
*Assistant Examiner* — Michael M Lee
(74) *Attorney, Agent, or Firm* — Oblon, McClelland, Maier & Neustadt, L.L.P.

(57) ABSTRACT

A communication device to allocate shared keys to plural channels includes a storage, a receiver, a storage controller, an allocator, and an encryption processor. The storage includes a predetermined number of storage areas to store one or more shared keys shared with a destination device. The receiver is configured to receive a shared key. The storage controller controls storing the received shared key in any of the storage areas every time the shared key is received. The allocator can allocate the storage areas to communication channels used for communicating encrypted data between the communication device and the communication destination device, based on a ratio predetermined for each communication channel. The encryption processor can, according to a cryptosystem determined for the each communication channel, encrypt data and decrypt the encrypted data by using the shared key acquired from the storage area allocated to each communication channel.

10 Claims, 11 Drawing Sheets

(52) U.S. Cl.
CPC .......... *H04L 9/0891* (2013.01); *H04L 9/0894* (2013.01); *H04L 9/14* (2013.01)

(56) References Cited

U.S. PATENT DOCUMENTS

| | | | | |
|---|---|---|---|---|
| 2005/0259825 A1* | 11/2005 | Trifonov | ............... | H04L 9/0858 380/277 |
| 2006/0093143 A1* | 5/2006 | Maeda | .................. | H04L 9/0852 380/256 |
| 2011/0243331 A1* | 10/2011 | Yasuda | ................. | H04L 9/0662 380/279 |
| 2013/0101121 A1* | 4/2013 | Nordholt | ............... | H04L 9/0852 380/279 |
| 2014/0013101 A1 | 1/2014 | Tanizawa et al. | | |
| 2014/0181522 A1 | 6/2014 | Tanizawa et al. | | |
| 2014/0365774 A1 | 12/2014 | Tanizawa et al. | | |
| 2015/0271147 A1 | 9/2015 | Tanizawa et al. | | |
| 2016/0034721 A1* | 2/2016 | Moriguchi | .......... | G06F 21/6218 713/193 |
| 2017/0324550 A1* | 11/2017 | Yuan | .................... | H04L 63/062 |

FOREIGN PATENT DOCUMENTS

| | | |
|---|---|---|
| JP | 2014-17595 | 1/2014 |
| JP | 5734934 | 6/2015 |
| WO | WO 2016/200929 A1 | 12/2016 |

\* cited by examiner

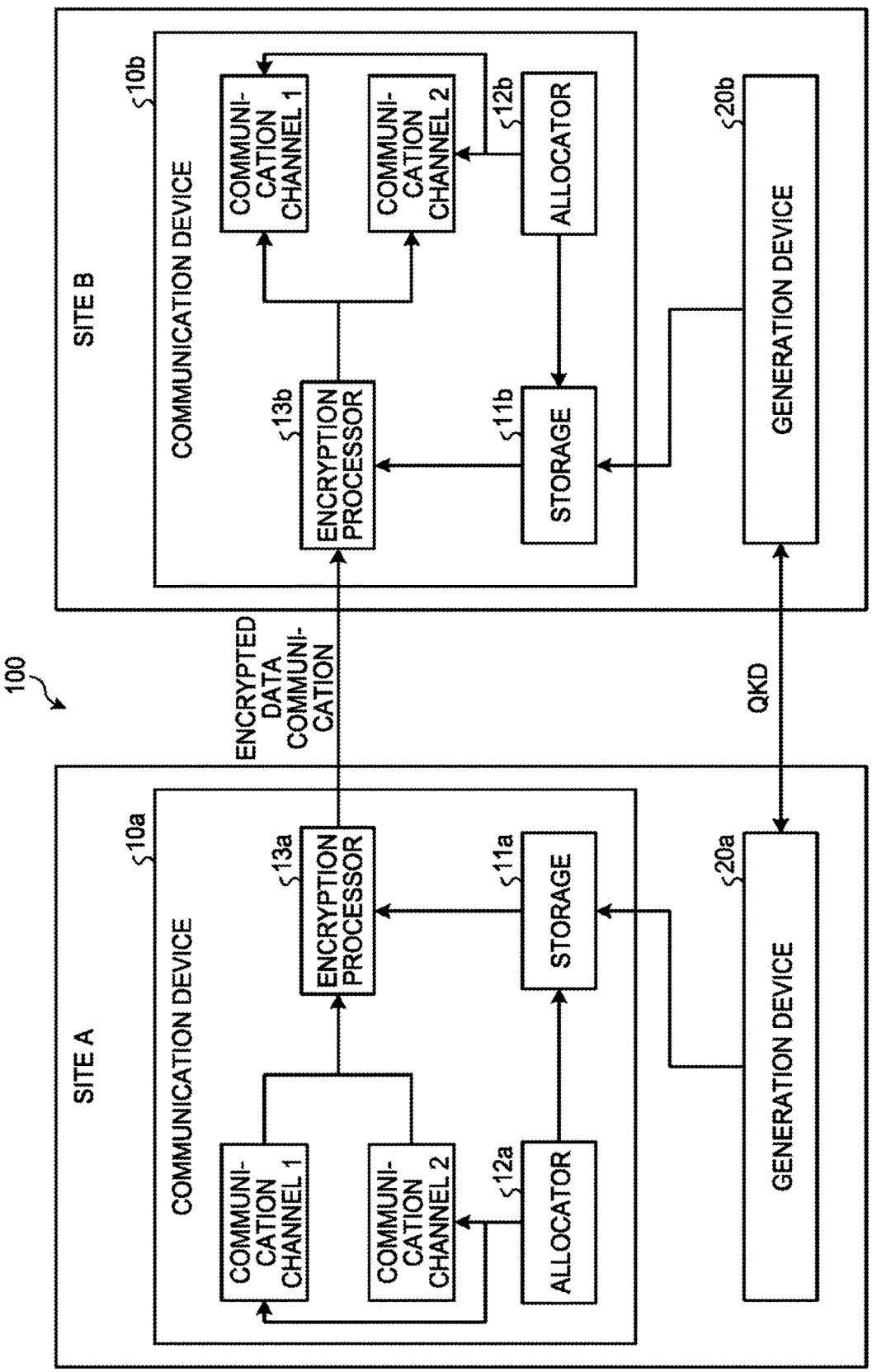

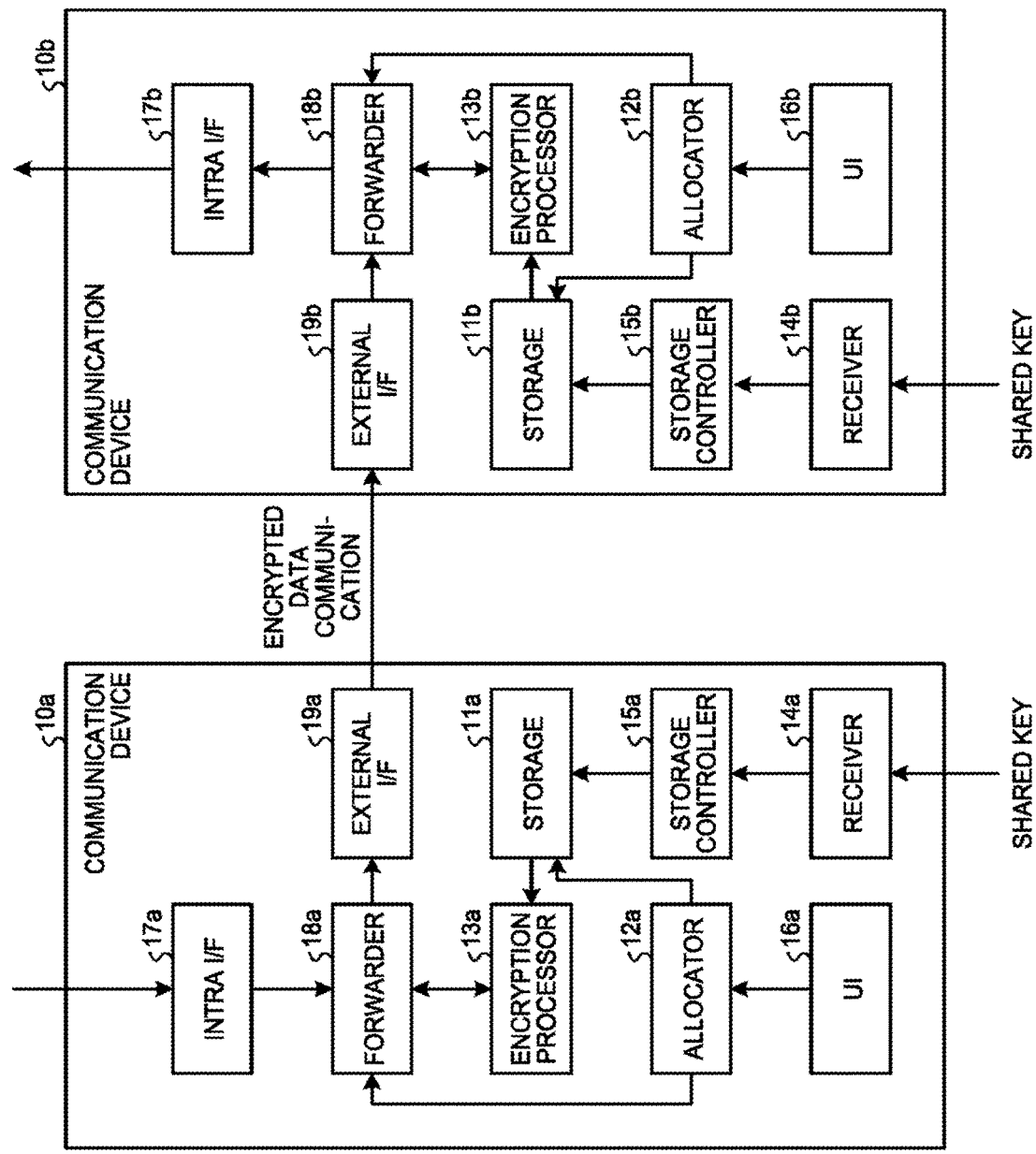

FIG.5

```
1  ·Crypto map example-map 10 ipsec-isakmp #SETTING CRYPTOSYSTEM
2    -set peer 1.2.0.2 #DESIGNATING COMMUNICATION COUNTERPARTY
3    -set transform-set example-transform #DESIGNATING DETAILS OF CRYPTOSYSTEM
4    -match address example-acl #DESIGNATING TRAFFIC WHICH IS TO BE ENCRYPTED
5    -set security-association lifetime kilobytes 4096 #4 M BYTES
6    -set security-association lifetime seconds 10800 #3 HOURS
7    -set security-association frequency qkdratio 30 #USING 30% OF QKD KEY
8  ·Interface interface-id #SETTING COMMUNICATION INTERFACE
9    -crypto map example-map #APPLYING SETTING OF CRYPTOSYSTEM TO INTERFACE
```

FIG.6

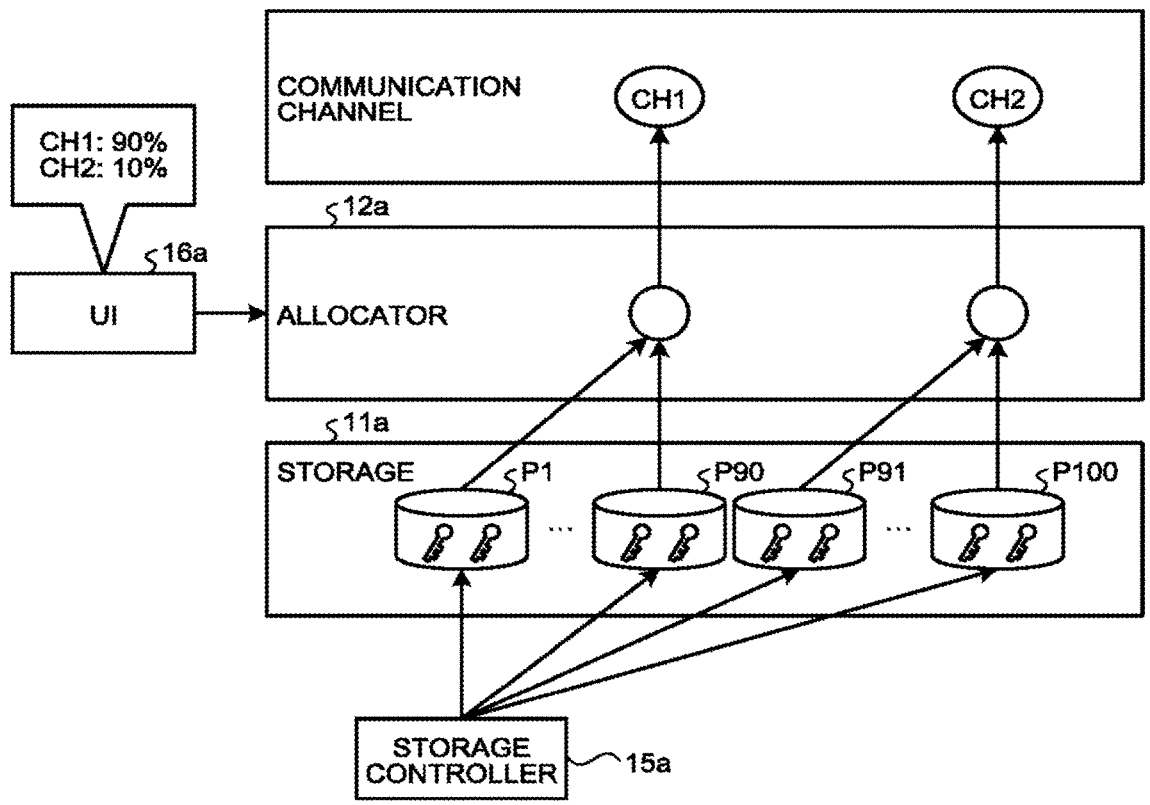

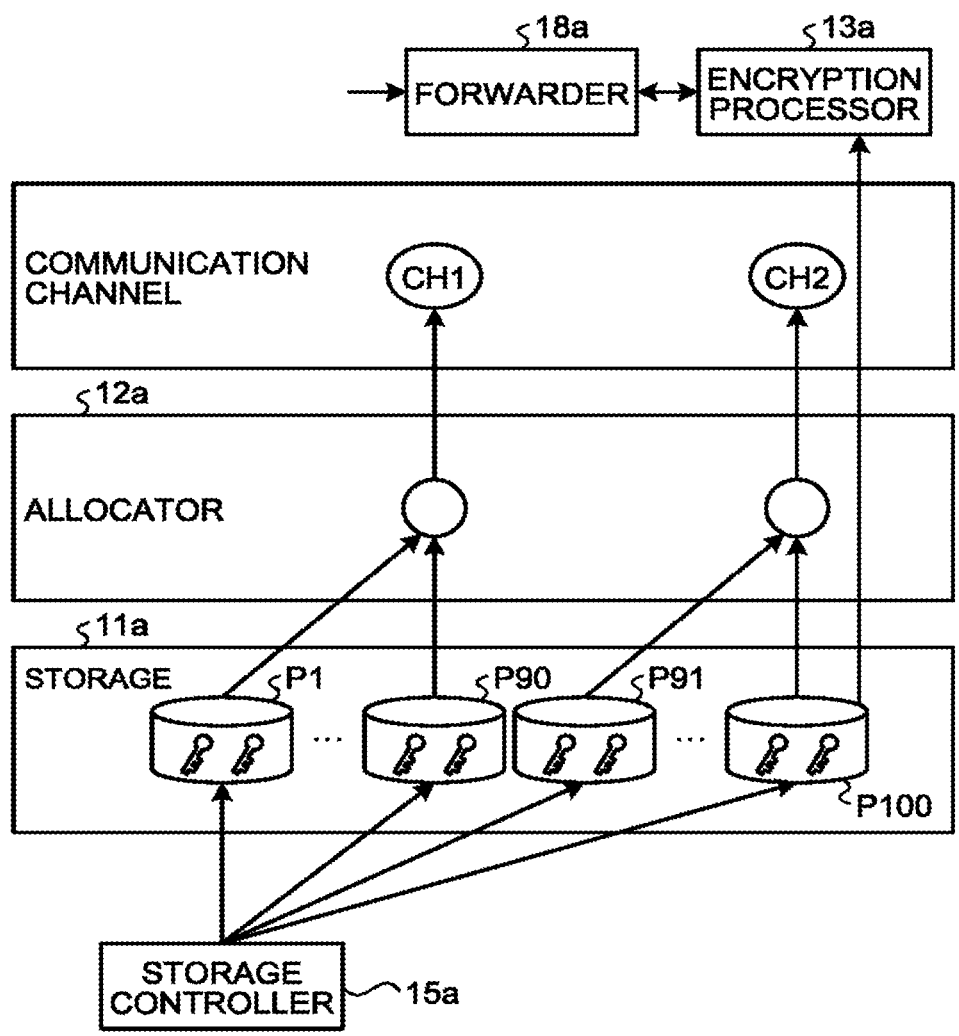

FIG.11

```
1   ·Crypto map example-map 10 ipsec-isakmp #SETTING CRYPTOSYSTEM
2     -set peer 1.2.0.2 #DESIGNATING COMMUNICATION COUNTERPARTY
3     -set transform-set example-transform #DESIGNATING DETAILS OF
        CRYPTOSYSTEM
4     -match address example-acl #DESIGNATING TRAFFIC WHICH IS TO BE
        ENCRYPTED
5     -set security-association lifetime kilobytes 4096 #4 M BYTES
6     -set security-association lifetime seconds 10800 #3 HOURS
7     -set security-association frequency qkdratio 30 #USING 30% OF QKD KEY
8     -set notification threshold lifetime seconds 60 #THRESHOLD VALUE OF
        UPDATE FREQUENCY OF KEY FOR NOTIFICATION
9     -set fall-down threshold lifetime seconds 120 #THRESHOLD VALUE OF
        UPDATE FREQUENCY OF KEY FOR FALL-DOWN
10    -set fall-down transform-set falldown-transform #DESIGNATING FALL-DOWN
        CRYPTOSYSTEM
11    -set disable threshold lifetime seconds 600 #THRESHOLD VALUE OF UPDATE
        FREQUENCY OF KEY FOR STOPPING COMMUNICATION
12    -set maximum threshold lifetime seconds 0.01 #UPPER LIMIT OF UPDATE
        FREQUENCY OF KEY
13  ·Interface interface-id #SETTING COMMUNICATION INTERFACE
14    -crypto map example-map #APPLYING SETTING OF CRYPTOSYSTEM
        TO INTERFACE
```

COMMUNICATION DEVICE, COMMUNICATION SYSTEM, AND COMMUNICATION METHOD ALLOCATING SHARED KEYS TO PLURAL CHANNELS

CROSS-REFERENCE TO RELATED APPLICATIONS

This application is based upon and claims the benefit of priority from Japanese Patent Application No. 2016-165650, filed on Aug. 26, 2016; the entire contents of which are incorporated herein by reference.

FIELD

Embodiments described herein relate generally to a communication device, a communication system, and a communication method.

BACKGROUND

In the art, there has been known quantum key distribution (QKD) where a shared key for encrypted data communication is securely shared by using single photons continuously transmitted between a transmission node and a reception node which are connected through an optical fiber.

In a quantum key distribution system (quantum cryptographic communication system), a generation speed of the shared key depends on a distance between sites, a quality of the optical fiber, and the like. The generation speed is in a range of several kbps to several hundred kbps. The generation speed of the shared key changes according to an external environment and disturbance of the optical fiber, installation environments of the transmission node and the reception node, and the like. Furthermore, in a case where there is an attack suspected as wiretapping, there is a possibility that the generation speed of the shared key may be sharply decreased or the generation may be stopped.

In the quantum key distribution technique in the art, it has been difficult to efficiently allocate shared keys that are continuously generated at a varying speed to a plurality of channels while synchronizing with a communication destination device.

BRIEF DESCRIPTION OF THE DRAWINGS

FIG. 3 is a diagram for describing an overview of the communication system according to the first embodiment;

FIG. 4 is a diagram illustrating an example of a functional configuration of a communication device according to the first embodiment;

FIG. 5 is a diagram illustrating an example of setting of the communication device according to the first embodiment;

FIG. 6 is a diagram illustrating an example of an allocation process according to the first embodiment;

FIG. 7 is a diagram illustrating an example of a process of encrypting data according to the first embodiment;

FIG. 11 is a diagram illustrating an example of setting of the communication device according to the second embodiment;

DETAILED DESCRIPTION

According to an embodiment, a communication device includes a storage, a receiver, a storage controller, an allocator, and an encryption processor. The storage has a predetermined number of storage areas capable of storing one or more shared keys shared with a communication destination device. The receiver is configured to receive a shared key. The storage controller is configured to store the received shared key in any one of the storage areas every time the shared key is received. The allocator is configured to allocate the storage areas to a plurality of communication channels used for communicating encrypted data between the communication device and the communication destination device, based on a ratio predetermined for each communication channel. The encryption processor is configured to, according to a cryptosystem determined for the each communication channel, encrypt data and decrypt the encrypted data by using the shared key acquired from the storage area allocated to each communication channel.

Embodiments of communication devices, communication systems, and communication methods will be described in detail with reference to the attached drawings.

First Embodiment

First, a communication system according to a first embodiment will be described.

Device Configuration of Communication System

Figure 1:
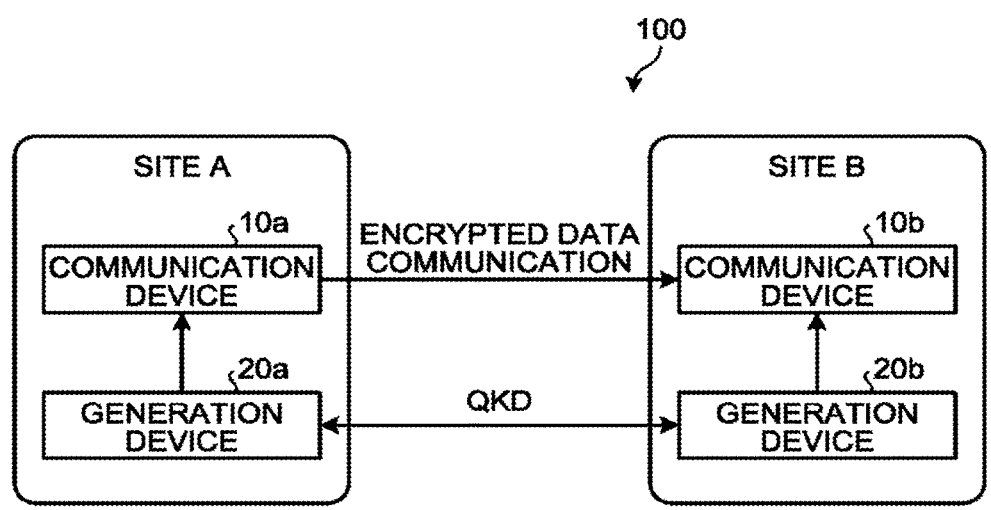
FIG. 1 is a diagram illustrating an example of a device configuration of a communication system according to a first embodiment.

FIG. 1 is a diagram illustrating an example of a device configuration of a communication system 100 according to the first embodiment. The communication system 100 according to the first embodiment is configured to include a communication device 10a, a communication device 10b, a generation device 20a, and a generation device 20b. The communication device 10a and the generation device 20a are installed at a site A. The communication device 10b and the generation device 20b are installed at a site B. The communication system 100 according to the first embodiment is a system that communicates between the site A and the site B on the basis of encrypted data.

In the description of the first embodiment, a case where a communication device 10a encrypts data and a communication device 10b decrypts encrypted data will be described as an example. In addition, the communication device 10b may encrypt the data, and the communication device 10a may decrypt the encrypted data.

The communication device 10a encrypts the data by using a shared key generated by a generation device 10a and transmits the encrypted data to the communication device 10b. The communication method for the encrypted data may be a wired or wireless method, or a combination of wired and wireless methods may be used. The communication method for the encrypted data is, for example, Ethernet (registered trademark). The communication device 10a is, for example, a relay device (a router, a switch, or the like) for a device in a site A to communicate with a device in a site B.

The communication device 10b decrypts the encrypted data by using a shared key generated by a generation device 20b. The communication device 10b is, for example, a relay device (a router, a switch, or the like) for a device inside the site B to communicate with a device inside the site A.

The generation device 20a and the generation device 20b generate shared keys shared with each other by quantum key distribution.

Hereinafter, in a case where the communication device 10a and the communication device 10b are not distinguished from each other, it is simply referred to as a communication device 10. Similarly, in a case where the generation device 20a and the generation device 20b are not distinguished from each other, it is simply referred to as generation device 20.

Quantum Key Distribution

Next, an example of a shared key generation method by using quantum key distribution will be described.

Figure 2:
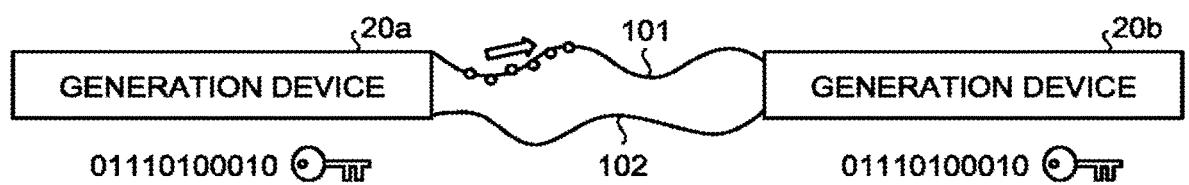
FIG. 2 is a diagram for describing an example of a shared key generation method according to the first embodiment.

FIG. 2 is a diagram for explaining the example of the shared key generation method according to the first embodiment. The generation device 20a and the generation device 20b according to the first embodiment are connected by a quantum communication path 101 and a classical communication path 102.

The quantum communication path 101 transmits a sequence of photons configured with single photons indicating 0 or 1. The quantum communication path 101 is, for example, an optical fiber link.

The classical communication path 102 transmits data. The data transmitted through the classical communication path 102 is control data for a key distillation process (a shifting process, an error correction process, and a confidentiality enhancement process) executed by, for example, the generation devices 20a and 20b. The classical communication path 102 may be a wired or wireless path or may be realized by combining the wired and wireless paths. The classical communication path 102 is, for example, Ethernet (registered trademark).

The generation devices 20a and 20b generate the shared keys shared with each other by quantum key distribution. The shared key is a random number represented by a sequence of digital data indicating 0 or 1. Specifically, the generation device 20a generates a single photon by pulses of the laser and transmits a sequence of photons configured with the single photons to the generation device 20b through the quantum communication path 101. The generation device 20a and the generation device 20b generate the shared keys from the sequence of photons by executing the key distillation process. The generation device 20a and the generation device 20b allocate an ID for identifying the shared key to the associated shared key.

There are various variations in the method of transmitting and receiving a sequence of photons on a quantum communication path 101. As a method of transmitting and receiving the sequence of photons on the quantum communication path 101, for example, a BB 84 protocol is used. In a case where the BB 84 protocol is used, if a sequence of photons on the quantum communication path 101 is wiretapped, a quantum state (photon polarization direction) of the photon is chanced according to the principle of quantum mechanics. This increases a quantum bit error rate (QBER) detected at the reception side. Therefore, in a case where the sequence of photons on the quantum communication path 101 is wiretapped, the generation device 20a and the generation device 20b can detect, from the abnormality of the quantum bit error rate, that the sequence of photons on the quantum communication path 101 is wiretapped. Accordingly, the generation devices 20a and 20b can safely generate the shared keys from the sequence of photons.

In FIG. 2, the generation device 20a and the generation device 20b are directly connected to each other. However, for example, in a case where each generation device 20 communicates with the generation devices 20 at a plurality of sites, each generation device 20 may be connected through the above-described communication device 10.

In addition, the generation device 20 may perform transfer of photons performed for generating a shared key and transmission and reception of the above-described control data between the communication device 10a and the communication device let. For example, in a case where the communication device 10 is connected to the communication devices 10 at a plurality of sites through optical fibers, the photons may be transferred by using the same optical fiber as the optical fiber through which the encrypted data are transmitted and received. In addition, even in a case where the generation device 20 transmits the photons through the communication device 10, the photons may be transferred by using dedicated optical fibers different from the optical fibers for transmission and reception of the encrypted data.

In the example of FIG. 1, one generation device 20 is connected to one communication device 10, hut a plurality of the generation devices 20 may be configured to be connected to one communication device 10. Alternatively, a plurality of the communication devices 10 within the site may be configured to share one generation device 20.

Overview of Communication System

Next, an overview of a communication system 100 according to the first embodiment will be described.

FIG. 3 is a diagram for explaining the overview of the communication system 100 according to the first embodiment. The communication system 100 according to the first embodiment realizes a communication infrastructure (communication link) for performing cryptographic communication between the site A and the site B. For example, an application operating on a device at the site A can perform cryptographic communication with an application operating on a device at the site B by the communication device 10a and the generation device 20a.

The communication system 100 is a multi-channel cryptographic communication system having a communication channel 1 and a communication channel 2. Hereinafter, in a case where the communication channel 1 and the communication channel 2 are not distinguished from each other, it is simply referred to as a communication channel.

The communication channel is an object of communication control. For example, the communication channel may be distinguished for each connection port of the communication device 10. The connection port is, for example, an interface for connecting an Ethernet (registered trademark) cable. In addition, for example, the communication channel may be a TCP connection that is distinguished for each combination of source IP address and a source TCP port. In addition, for example, in a case where the communication device 10 uses a communication method multiplexed by a method such as optical wavelength multiplexing, the communication channel may be a wavelength allocated for communication.

In addition, for example, in the case of virtualizing a communication function of the communication device 10, the communication channel may be traffic controlled by the virtualized communication function. An example of virtualization of the communication function is, for example, a VLAN. Specifically, individual VLANs to which different VLAN IDs are allocated according to ULAN setting of the communication device 10 are communication channels. In addition, the communication function may be virtualized by realizing the communication function by software like software defined network (SDN) and network function virtualization (NFV). Specifically, each of the communication functions realized by software is a communication channel.

The number of communication channels and the setting of each communication channel can be freely added, deleted, changed, or the like by, for example, a user interface of the communication device 10.

Cryptographic communication using the communication channel 1 and cryptographic communication using the communication channel 2 are independent cryptographic communication. For example, the cryptosystem of cryptographic communication using the communication channel 1 and the cryptosystem of cryptographic communication using the communication channel 2 may be different from each other. In addition, the communication channel 1 and the communication channel 2 may not be encrypted.

In the example of FIG. 3, for simplifying the description, the number of communication channels is two, but the number of communication channels may be an arbitrary number of one or more.

A case where the encrypted data are transmitted from the communication device 10a of the site A to the communication device 10b of the site B will be described with reference to the overview of the communication system 100.

A storage 11a stores a shared key generated by the generation device 20a. An allocator 12a allocates storage areas of the storage 11a that are to store the shared key to the communication channel 1 and the communication channel 2. An encryption processor 13a encrypts data transmitted from a transmission source device of the site A according to a cryptosystem determined for each of the communication channels by using the shared key acquired from the storage area allocated to the communication channel as a transmission key (encryption key). The encryption processor 13a transmits the encrypted data to the communication device 10b.

On the other hand, a storage 1ib stores a shared key generated by the generation device 20b. An allocator 12b allocates the storage areas of the storage 11a that is to store the shared key to the communication channel 1 and the communication channel 2. An encryption processor 13b decrypts the encrypted data according to the cryptosystem determined for each of the communication channels by using the shared key acquired from the storage area allocated to the communication channel as the reception key (decryption key). The encryption processor 13a transmits the decrypted data to a transmission destination device of the site B.

The storage 11a may be provided outside the communication device 10a. Similarly, the storage 11b may be provided outside the communication device 10b.

As described above, the allocator 12a can realize a plurality of types of cryptographic communication simultaneously (individually) by allocating the shared key to a plurality of cryptographic communication entities (communication channels). Namely, according to the communication system 100 according to the first embodiment, it is possible to virtualize a pair of communication infrastructures (communication links) into a plurality of virtual communication infrastructures (virtual communication links).

If it is assumed that the above-described communication system 100 dynamically adds or deletes a plurality of the virtual communication links on the basis of operational requirements, it can be considered that this is close to SDN or NFV.

Functional Configuration of Communication Device

Next, an example of the functional configuration of the communication device 10 according to the first embodiment will be described in detail.

FIG. 4 is a diagram illustrating an example of a functional configuration of the communication device 10 according to the first embodiment. In the description of FIG. 4, a case where the communication device 10a transmits the encrypted data to the communication device 10b and the communication device 10b decrypts the encrypted data will be described as an example. In addition, the communication device 10b may transmit the encrypted data to the communication device 10a, and the communication device 10a may decrypt the encrypted data.

The communication device 10a according to the first embodiment is configured to include a storage 11a, an allocator 12a, an encryption processor 13a, a receiver 14a, a storage controller 15a, a user interface (UI) unit 16a, an intra interface (I/F) unit 17a, a forwarder 18a, and an external I/F 19a.

The storage 11a has a predetermined number of storage areas capable of storing one or more shared keys. The storage areas capable of storing one or more shared keys are, for example, 100 storage areas having a predetermined data size. The storage 11a may be provided outside the communication device 10a.

If the receiver 14a receives the shared key from the generation device 20a, the receiver 14a inputs the shared key to the storage controller 15a.

If the storage controller 15s receives the shared key from the receiver 14a, the storage controller 15a stores the shared key in one of the above-described storage areas. The storage controller 15a sequentially stores, for example, the shared keys in a plurality of storage areas in a round robin manner.

The UI 16a receives an input by the user. For example, the UI 16a receives an input indicating the setting of the communication device 10a. For example, the UI 16a receives an input designating a ratio at which the communication channel can use the shared key retained in the communication device 10a for each communication channel.

Example of Setting of Communication Device

FIG. 5 is a diagram illustrating an example of the setting of the communication device 10a according to the embodiment. The example in FIG. 5 illustrates an example of commands input from a terminal or the like connectable to the communication device 10a. In addition, a character string after # is a comment indicating a description of the command.

In Line 1, "crypto map example-map 10 ipsec-isakmp" is a command to set a cryptosystem (example-map). The command of Line 1 is a command to start defining the setting of a new cryptosystem. Herein, the case of defining an IPsec cryptosystem is illustrated.

Commands of Lines 2 to 7 are specific examples of the set q of the cryptosystem.

In Line 2, "set peer 1.2.0.2" is a command to designate a communication destination device. Herein, a case where the IP address of the communication device 10b as a communication destination device is designated is illustrated.

In Line 3, "set transform-set example-transform" is command to set the details of the cryptosystem. The "example-transform" illustrating the content of the detailed setting is separately defined. The "example-transform" includes, for example, an encryption algorithm such as advanced encryption standard (AES) and a key length (for example, 256 bits) in the encryption algorithm. The command of Line 3 illustrates a case where the separately-defined "example-transform" is applied.

In Line 4, "match address example-acl" is a command to designate a traffic type which is to be encrypted. Similarly to the case of Line 3, specific information on the traffic type is separately set in the "example-acl" in a form of an access control list (ACL). The command of Line 4 illustrates a case where the separately-defined "example-acl" is applied.

The commands of Lines 5 to 7 are commands to set an update frequency of the shared key used for the encryption process and the decryption process.

In Line 5, "set security-association lifetime kilobytes 4096" is a command to perform setting of updating the shared key every time 4 Mbytes (4096 kbytes) of the encrypted data is transferred according to the cryptosystem (example-map).

In Line 6, "set security-association lifetime seconds 10800" is a command to perform setting of updating the shared key every time three hours (10800 seconds) elapse.

In line 7, "set security-association frequency qkdratio 30" is a command to set a shared key updating method newly proposed in the embodiment. The command of Line 7 is an example of a case where 30% of the shared keys generated by a quantum key distribution function of the generation device 20a is set to be allocated to the cryptographic communication. As described above, the generation speed of the shared key generated through the quantum key distribution varies Therefore, the setting of designating the shared key generated through the quantum key distribution as a ratio of the shared key retained in the communication device 10a to the entire resources is not based on a predetermined data transfer amount and a predetermined lapse of time. Namely, the update frequency and update interval of the shared key also vary.

In addition, all the commands of Lines 5 to 7 are setting with respect to the update frequency of the shared key. Herein, the description is merely provided in order to explain three types of setting examples. In the case of simultaneously performing setting of the update frequencies of a plurality of the shared keys as illustrated in Lines 5 to 7, when one of all the conditions is satisfied, the shared keys may be updated. In addition, the input of the commands of Lines 5 and 6 may be omitted.

In Line 8, "Interface interface-id" is a command to start setting of a specific communication interface (communication channel) of the communication device 10a.

In Line 9, "crypto map example-map" is a command to apply a cryptosystem (example-map) to the communication interface designated by the command of Line 8.

Returning to FIG. 4, the allocator 12a allocates the storage areas to the communication channels by associating the communication channels with the above-described storage areas. When the encryption processor 13a encrypts data and transmits the data, the encryption processor 13a uses the shared key of the storage area allocated to the communication channel which is to be used for transmission as the transmission key. In addition, when the encryption processor 13a decrypts the encrypted data, the encryption processor 13a uses the shared key of the storage area allocated to the communication channel which is to be used for receiving the encrypted data as the reception key.

The allocator 12a transmits association information indicating the association between the communication channels and the storage areas to the communication device 10b through the forwarder 10a. Such communication is called key synchronization control communication. By the key synchronization control communication, the association information is synchronized between the communication device 10a and the communication device 10b.

In addition, the key synchronization control communication may be performed between the generation device 20a and the generation device 20b by the allocator 12a transmitting the association information to the generation device 20a.

In addition, although the association information needs to be shared between the communication device 10a and the communication device 10b, the association information may be set in advance at the time of activating the communication device 10a and the communication device 10b or the like. In this case, the key synchronization control communication for synchronizing the association information is unnecessary.

Example of Allocation Process

FIG. 6 is a diagram illustrating an example of the allocation process according to the first embodiment. If the storage controller 15a receives the shared key from the receiver 14a, the storage controller 15a stores the shared key in a predetermined number of storage areas which are prepared in advance. The example of FIG. 6 illustrates a case where there are 100 storage areas piles) as storage areas P1 to P100. The storage controller 15a sequentially stores the shared keys in the storage areas P1 to P100, for example, in a round robin manner.

The number of storage areas P is a number (independently determined number) that does not depend on the number of communication channels, the number of communication hardware interfaces of the communication device 10a, a communication speed of the communication device 10a, and the like. The number of storage areas P may be any number. For example, in a case where the number of storage areas P is 100, the UI can receive an allocation ratio of the shared keys to the channels in units of 1% from 0% to 100%. In addition, for example, in a case where the number of storage areas P is 10, the UI 16a can receive an allocation ratio of the shared keys to the communication channels in units of 10% from 0% to 100%.

In addition, in a case where the communication device 10a is connected to a plurality of the generation devices 20, if the storage controller 15a stores the shared keys generated through quantum key distribution of different generation devices 20a in the same storage area P, the storing is not preferable because it is difficult to manage the shared keys.

The UI 16a sets the ratio at which the communication channel 1 (CH 1) can use the shared key to 90%, for example, by the above-described "set security-association frequency qkdratio" command (refer to FIG. 5) and receives the setting of the ratio at which the communication channel 2 (CH 2) can use the shared key to 10%. In this case, for example, the allocator 12a allocates the storage areas P1 to P90 to the communication channel 1 and allocates the storage areas P91 to P100 to the communication channel 2.

Although a plurality of the storage areas P can be associated with one communication channel, a plurality of the communication channels cannot be associated with one storage area P.

In addition, the allocator 12a may further allocate the storage areas P by discriminating whether to use the shared key as a transmission key or a reception key. For example, the allocator 12a may allocate the storage areas P1 to P45 among the storage areas P1 to P90 to the transmission key of the communication channel 1 and may allocate the storage areas P46 to P90 to the reception key of the communication channel 1. In addition, for example, the allocator 12a may allocate the storage areas P91 to P95 among the storage areas P91 to P100 to the transmission key of the communication channel 2 and may allocate the storage areas P96 to E100 to the reception key of the communication channel 2.

Returning to FIG. 4, the intra I/F 17a is an interface for connection to one or more devices inside the site A. The connection standard of the intra I/F 17a is, for example, Ethernet (registered trademark). The intra I/F 17a transfers data between the device and the communication device 10a. The intra I/F 17a may have a plurality of connection ports for connection to a plurality of devices.

The data transmitted and received by the intra I/F 17a are not encrypted. In the case of using an encryption function of the communication device 10a, the data received by the intra I/F 17a are encrypted by the encryption processor 13a before being transmitted to the communication device 10b through the external I/F 19a. On the other hand, the encrypted data received by the external I/F 19a are decrypted by the encryption processor 13a before being transmitted to the device inside the site A through the intra I/F 17a.

The forwarder 18a transfers data. Specifically, the forwarder 18a transfers the data received by the intra I/F 17a to the external I/F 19a. In addition, the forwarder 18a transfers the data received by the external I/F 19a to the intra I/F 17a.

In addition, when the forwarder 18a transfers data, the forwarder 15a may change the format of the data. For example, the forwarder 10a may change a portion of the packet header. In addition, the forwarder 18a may provide general packet transfer (switch function) such as address translation (Network Address Translation). The forwarder 16a may transfer the data received by the intra I/F 17a to the intra I/F 17a again by the switch function.

In the case of encrypting the data, the forwarder 18a inputs an encryption request for the data to the encryption processor 13a. In addition, in the case of decrypting the encrypted data, the forwarder 18a inputs a decryption request for the encrypted data to the encryption processor 13a.

If the encryption processor 13a receives the encryption request for the data from the forwarder 18a, the encryption processor 13a encrypts the data. In addition, if the encryption processor 13a receives the decryption request for the encrypted data from the forwarder 18a, the encryption processor 13a decrypts the encrypted data.

FIG. 7 is a diagram illustrating an example of a process of encrypting the data according to the first embodiment. In the example of FIG. 7, the forwarder 18a receives data from the intra I/F 17a, and the encryption processor 13a encrypts the data.

The forwarder 18a specifies the communication channel which is to be used for transmitting the data received from the intra I/F 17a. In the example of FIG. 7, the specified communication channel is the communication channel 2. The forwarder 18a inputs, to the encryption processor 13a, an encryption request for encrypting data according to the cryptosystem used for the communication channel 2.

In addition, the forwarder 18a can use the existing technology as a method of determining the type of traffic (data) flowing into the intra I/F 17a. In addition, the forwarder 18a can use the existing technology of specifying the communication channel which is to be used for transmitting the data from the type of the traffic and selecting the cryptosystem of the specified communication channel.

In a case where the cryptosystem of the communication channel 2 is the cryptosystem using the shared key acquired through the quantum key distribution, the encryption processor 13a encrypts the data by using the shared key stored in the storage area P associated with the communication channel 2 as a transmission key.

In the example of FIG. 7, the communication channel is associated with the storage areas P91 to P100. Therefore, the encryption processor 13a encrypts the data by using the shared key stored in any of the storage areas P91 to P100 as a transmission key.

In addition, like the example of FIG. 7, in a case where a plurality of the storage areas P are associated with one communication channel, various methods are considered to be a method of determining which storage area P a common key thereof is used. As the simplest method, there is a method of using the shared key one by one in order from the younger one of the IDs (in this case, the numbers P91 to P100) assigned to the storage area P. According to this rule, as long as the association between the storage areas P and the communication channels is correctly synchronized between the communication device 10a and the communication device 10b, every time the common key is used, there is no need to perform the key synchronization control communication.

In addition, variations of the method of determining the update frequency of the common key are also considered. For example, there is a method in which the storage controller 15a updates the common key used for encrypting the communication channel at the timing of storing the common key in any of the storage areas P associated with the communication channel. Namely, every time the shared key is stored in the storage area P allocated to the communication channel, the encryption processor 13a updates the shared key used for encrypting the data (at the time of transmission) or decrypting the encrypted data (at the time of reception) by acquiring the shared key from the storage area P allocated to the communication channel.

In addition, for example, there is a method of calculating a common key distribution speed allocated to the communication channel, which is obtained as a result of multiplication of a ratio of the number of storage areas P associated with the communication channel to the total number of storage areas P and a quantum key distribution speed and determining the update frequency (update interval) of the common key on the basis of the common key distribution speed. Namely, the encryption processor 13a updates the shared key used for encrypting the date (at the time of transmission) or decrypting the encrypted data (at the time of reception) by acquiring the shared key from the storage area P allocated to the communication channel at intervals corresponding to the speed at which the receiver 14a receives the shared key and the ratio at which the communication channel can use the shared key. For example, in the case of the communication channel to which the storage areas P1 to P50 (50%) are allocated among the storage areas P1 to P100, the encryption processor 13a updates the shared key used for encrypting the data (at the time of transmission) or decrypting the encrypted data (at the time of reception) at a rate of once every two times among the timings at which the shared key is stored in the storage 11a. Therefore, in a case where the shared key is stored in the storage areas P1 to P100 in a round robin manner, every time the shared key is stored in the storage areas P1 to P50, the update interval can be averaged in comparison with the method of updating the shared key used for encrypting the data (at the time of transmission) or decrypting the encrypted data (at the time of reception).

In a case where it is not the timing of updating the shared key, the encryption processor 13a encrypts the data (at the time of transmission) or decrypts the encrypted data (at the time of reception) by using the latest shared key acquired from the storage area P.

In addition, various algorithms are available for encryption algorithms. For example, the encryption algorithm is a block cipher such as AES and data encryption standard (DES). In addition, the encryption algorithm may be OTP. As to which portion of the data is encrypted, various variations are also considered. For example, the portion to be encrypted (encryption range) may be Layer-4 encryption of encrypting a payload portion such as TCP and DDP of data. In addition, for example, the portion to be encrypted may be Layer-3 encryption of encrypting a data portion of an IP packet. In addition, for example, the portion to be encrypted may be Layer-2 encryption or Layer-1 encryption of encrypting a data portion of an Ethernet (registered trademark) frame. Communication for synchronizing the ID of the key to be used is performed between cryptographic communication infrastructure devices every time the encryption key is actually used, or other methods of identifying matching of keys used for encryption may also be used in combination by configuring the cryptographic communication packet so as to include the key ID.

Returning to FIG. 4, the external I/F 19a is an interface connected to the communication device 10b of the site B via the Internet, a carrier network, and the like. In the case of using an encryption function of the communication device 10a, the data transmitted by the external I/F 19a are encrypted by the encryption processor 13a. On the other hand, the encrypted data received by the external I/F 19a are decrypted into plaintext data by the encryption processor 13a.

In addition, an optical fiber is used for connection between the above-described generation devices 20a and 20b. However, an optical fiber or Ethernet (registered trademark) or the like may be used for connection between the external I/F 19a and the external I/F 19b.

The communication speed between the external I/F 19a and the external I/F 19b may be high-speed communication of several Gbps and several Tbps. In realizing such high-speed communication, techniques such as optical fiber multiplexing and optical wavelength multiplexing may be used. At this time, one or more communication wavelengths may be allocated as the above-mentioned communication channels, and high-speed communication may be performed by simultaneously using the allocated communication wavelengths. In this case, the communication speed of the communication channel can be high-speed communication of several Gbps and several Tbps.

On the other hand, the communication device 10b according to the first embodiment is configured to include a storage 1ib, an allocator 12b, an encryption processor 13b, a receiver 14b, a storage controller 15k, a UI 16k, an intra I/F 17b, a forwarder 18b, and an external I/F 19b. The configuration of the communication device 10b is the same as that of the communication device 10a.

Hereinafter, in a case where the functional blocks of the communication devices 10a and 10b are not distinguished from each other, it is simply referred to as the communication device 10 (the storage 11, the allocator 12, the encryption processor 13, the receiver 14, the storage controller 15, the UI 16, the intra I/F 17, the forwarder 18, and the external I/F 19).

In the description of the communication device 10b, a decryption process for the encrypted data transmitted from the communication device 10a will be described. The description of the allocator 12b, the receiver 14b, the storage controller 15b, and the UI 16b is the same as the description of the allocator 12a, the receiver 14a, the storage controller 15a, and the UI 16a, and thus, the description thereof will be omitted.

If the external I/F 19b receives the encrypted data from the communication device 10a, the external I/F 19b inputs the encrypted data to the forwarder 10b.

If the forwarder 18b receives the encrypted data from the external I/F 19b, the forwarder 18b inputs a decryption request for the encrypted data to the encryption processor 13b.

If the encryption processor 13b receives the decryption request for the encrypted data from the forwarder 16b, the encryption processor 13b decrypts the encrypted data by using the reception key corresponding to the transmission key used for encrypting the encrypted data. For example, in a case where the shared key stored in the storage area P10 of the communication device 10a of the transmission side is used as the transmission key, the encryption processor 11b uses the shared key stored in the storage area P10 of the storage 11b as the reception key.

The encryption processor 13b inputs the decrypted data (plaintext data) to the forwarder 18b.

If the forwarder 18b receives the plaintext data from the encryption processor 13b, the forwarder 18b inputs the plaintext data to the intra I/F 17b.

If the intra I/F 17b receives the plaintext data from the forwarder 18b, the intra I/F 17b transmits the plaintext data to a transmission destination device within the site B.

Communication Method

Next, a communication method according to the first embodiment will be described.

Transmission Method

Figure 8:
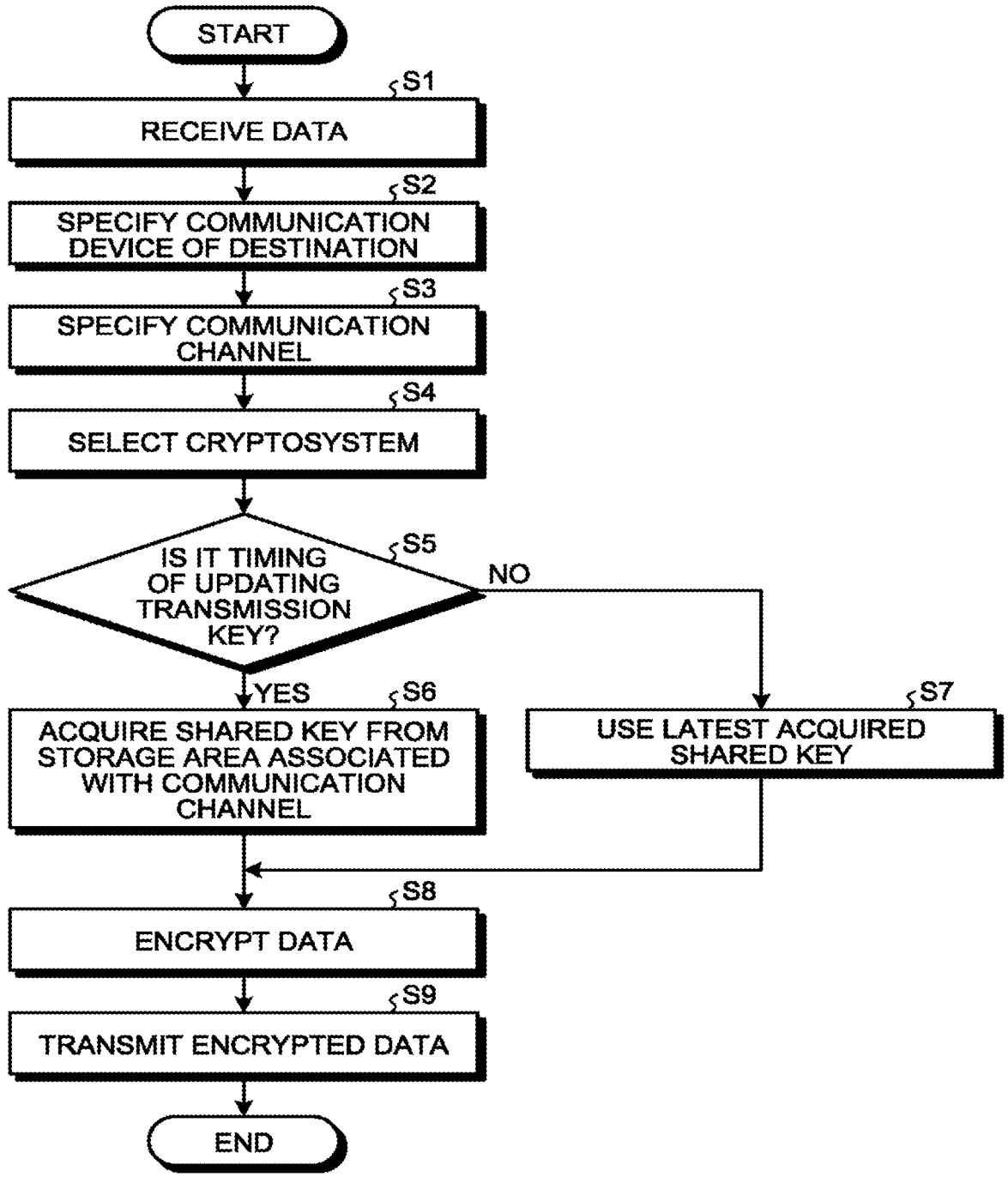
FIG. 8 is a flowchart illustrating an example of a transmission method according to the first embodiment.

FIG. 8 is a flowchart illustrating an example of a transmission method according to the first embodiment. First, the intra I/F 17a receives data from a device inside the site A (step S1).

Next, the forwarder 18a specifies the communication device 10b as a destination of the data received in the process of step S1 and converts a packet format (destination address or the like) (step S2). Next, the forwarder 18a specifies the communication channel which is to be used for transmission of the data (step S). Next, the forwarder 18a elects the cryptosystem used in the communication channel specified in step S3 (step S4).

Next, the encryption processor 13a determines whether or not it is the timing of updating the transmission key (step S5). In a case where it is the timing of updating the transmission key (Yes in step S5), the encryption processor 13a acquires the shared key from the storage area P associated with the communication channel (step S6). In a case where it is not the timing of updating the transmission key (No in step S5), the encryption processor 13a uses the latest shared key (the shared key retained in the encryption processor 13a) acquired from the storage area P associated with the communication channel (step S7).

Next, the encryption processor 13a encrypts the data received in the process of step S1 according to the cryptosystem selected in step S4 by using the transmission key (step S8).

Next, the forwarder 18a transmits the data encrypted by the process of step S8 to the communication device 10b at the destination specified in the process of step S2 through the external I/F 19a (step S9).

Reception Method

Figure 9:
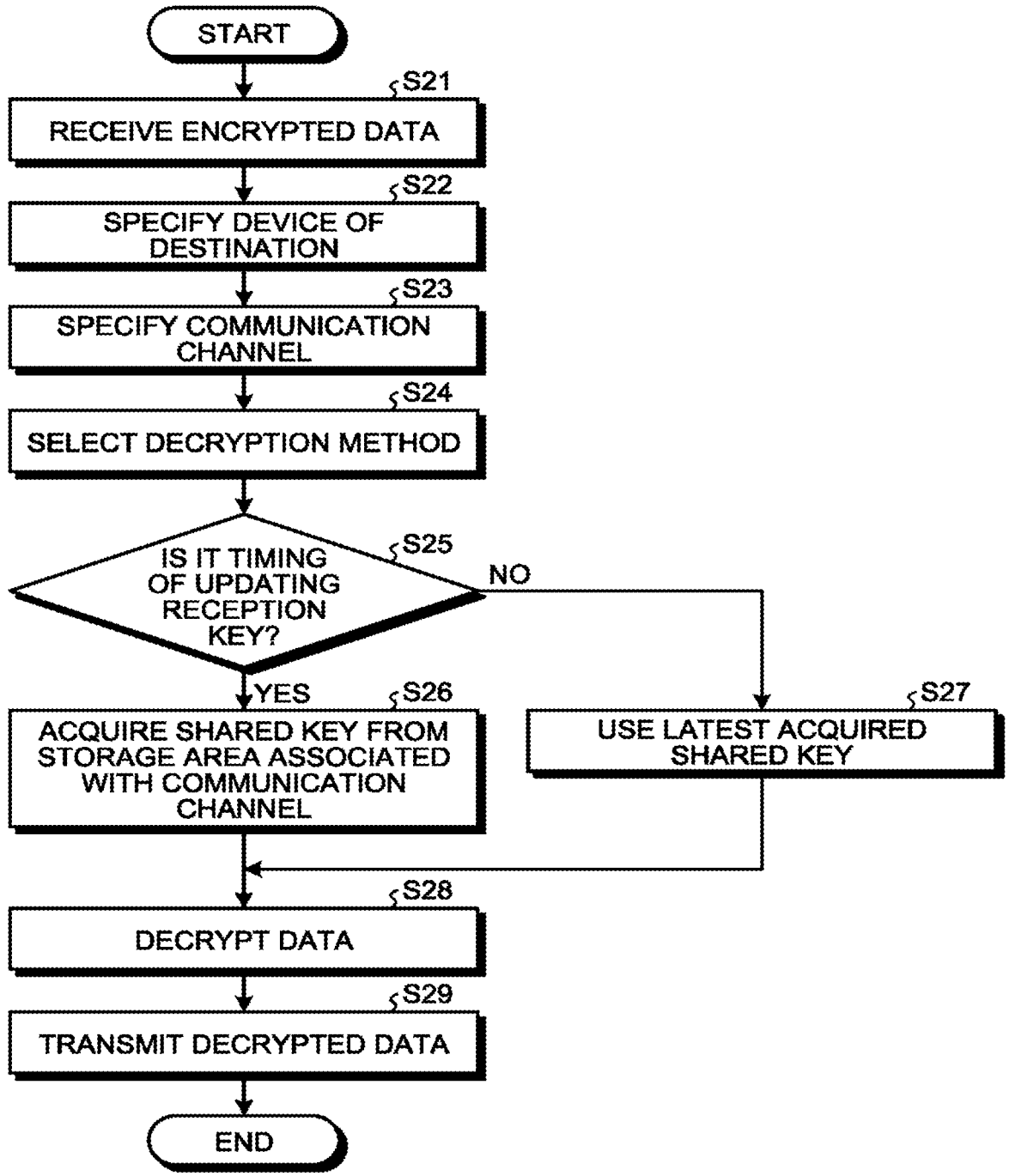
FIG. 9 is a flowchart illustrating an example of a reception method according to the first embodiment.

FIG. 9 is a flowchart illustrating an example of a reception method according to the first embodiment. First, the external I/F 19b receives the encrypted data from the communication device 10a at the site A (step S21).

Next, the forwarder 18b specifies the device inside the site B as a destination of the encrypted data received in the process of step S21 and converts a packet format (destination address or the like) (step S92). Next, the forwarder 18b specifies the communication channel which is used for reception of the encrypted data (step S23). Next, the forwarder 18b selects the decryption method (cryptosystem used for encryption) used in the communication channel specified in step S23 (step S24).

Next, the encryption processor 13b determines whether or not it is the timing of updating the reception key (step S25). In a case where it is the timing of updating the reception key (Yes in step S25), the encryption processor 13b acquires the shared key from the storage area P associated with the communication channel (step S26). In a case where it is not the timing of updating the reception key (No in step S25), the encryption processor 13b uses the latest shared key (the shared key retained in the encryption processor 13b) acquired from the storage area P associated with the communication channel (step S27).

Next, the encryption processor 13b decrypts the encrypted data received in the process of step S21 according to the decryption method selected in the process of step S24 by using the reception key (step S28).

Next, the forwarder 18b transmits the data (plain text data) decrypted in the process of step S28 to the destination device specified in the process of step S22 through the intra I/F 17b (step S29).

As described above, in the communication device 10 according to the first embodiment, the storage 11 has a predetermined number of storage areas that can store one or more shared keys shared with the communication destination device. The receiver 14 receives the shared key. The storage controller 15 stores the received shared key in one of the storage areas P every time the shared key is received. The allocator 12 allocates the storage area P to a plurality of the communication channels communicating with the communication destination device according to the ratio at which the communication channel can use the shared key retained in the communication device 10 on the basis of the encrypted data. After that, the encryption processor 13 encrypts the data and decrypts the encrypted data according to the cryptosystem determined for each of the communication channels by using the shared key acquired from the storage area P allocated to the communication channel.

As a result, according to the communication device 10 according to the first embodiment, it is possible to efficiently allocate the shared keys that are continuously generated at a varying speed to a plurality of the channels while synchronizing with the communication destination device.

Specifically, in the communication device 10 according to the first embodiment, since it is sufficient to synchronize the association information indicating the association between the storage areas P and the communication channels between the sites, a process procedure required for synchronizing which common key is used for each communication channel between the sites is greatly simplified. In a communication method in the art, for example, it has been necessary to synchronize which communication channel the individual common key is to be encrypted every time the common key is updated. In addition, for example, in the communication method in the art, it has been necessary to synchronize detailed information such as what rule the accumulated common key is allocated to each communication channel.

In addition, in a communication device in the art, in the case of using a block cipher algorithm such as AES, it is usual that the update frequency of the shared key is set "every certain time interval" or "every certain amount of data transfer". However, the generation speed of the shared key generated by using the quantum key distribution varies.

Therefore, updating the shared key, for example, at predetermined time intervals, causes problems. Specifically, the following two types of problems may occur.

(A) When the generation speed of the shared key increases, if the update interval of the shared key is constant, the shared key is overabundant, and the shared key overflows. In addition, avoiding the use of an available shared key (not updating the shared key) leads to a decrease in the efficiency of the shared key resources.

(B) When the generation speed of the shared key decreases, if the update interval of the shared key is constant, the shared key is insufficient, and the update process for the shared key fails.

On the other hand, in the communication device 10 according to the first embodiment, the UI 16 receives an input designating a ratio at which the communication channel can use the shared key retained in the communication device 10 for each communication channel. The allocator 1 allocates the storage area P to the communication channel according to the input (refer to Line 7 in FIG. 5) received by the UI 16.

As a result, according to the communication device 10 according to the first embodiment, since the shared key that is continuously generated at a varying speed can be efficiently allocated to a plurality of channels, it is possible to solve the problems (A) and (B).

Second Embodiment

Next, a second embodiment will be described. In the description of the second embodiment, the same description as that of the first embodiment will be omitted, and differences from the first embodiment will be described.

In the communication device 10 according to the first embodiment described above, the update frequency of the shared key used for the interface is determined according to the generation speed of the shared key generated by using the quantum key distribution and the ratio to the interface (communication channel) to which the shared key is allocated.

Namely, in the communication device 10 according to the first embodiment, the update frequency of the shared key varies. The varying itself of the update frequency of the shared key can be accepted. However, the reason why the quantum cryptographic communication is used basically is that the shared key can be frequently updated and, as a result, higher security can be ensured. Therefore, it is not desirable that the update frequency of the shared key is decreased down to an expected value or less (the update interval of the shared key is widened).

Therefore, in the second embodiment, a configuration capable of coping with a case where the update frequency of the shared key is decreased down to an expected value or less (the update interval of the shared key is widened) will be described.

A device configuration of a communication system 100 according to the second embodiment is the same as the device configuration of the communication system 100 according to the first embodiment, and thus, the description thereof will be omitted.

Functional Configuration of Communication Device

Figure 10:
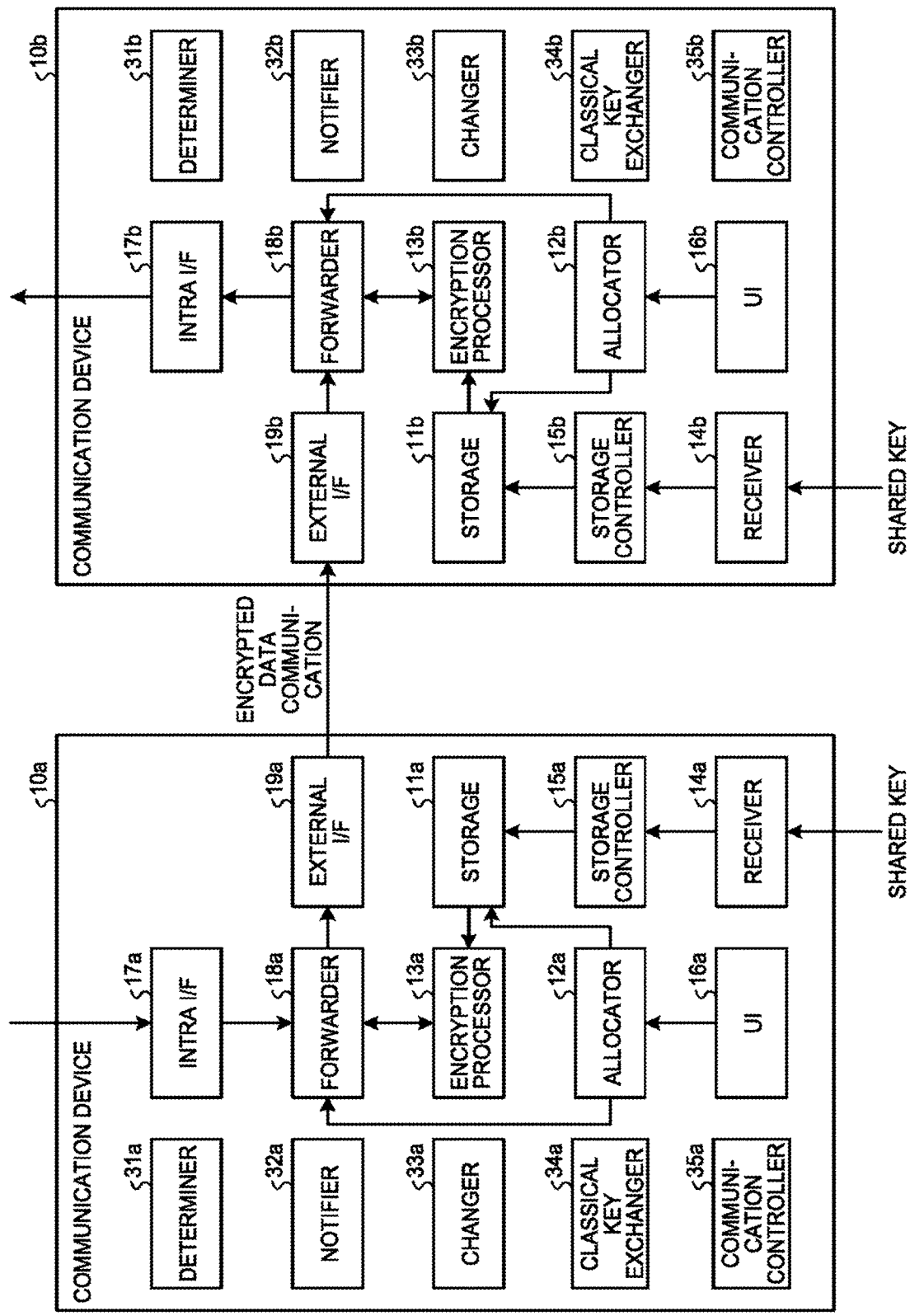
FIG. 10 is a diagram illustrating an example of a functional configuration of a communication device according to a second embodiment.

FIG. 10 is a diagram illustrating an example of a functional configuration of a communication device 10 according to the second embodiment. Since configurations of communication devices 10*a* and 10*b* are the same, the communication device 10*a* will be described.

The communication device 10*a* according to the second embodiment is configured to include a storage 11*a*, an allocator 12*a*, an encryption processor 13*a*, a receiver 14*a*, a storage controller 15*a*, a UI 16*a*, an intra I/F 17*a*, a forwarder 18*a*, an external I/F 19*a*, a determiner 31*a*, a notifier 32*a*, a changer 33*a*, a classical key exchanger 34*a*, and a communication controller 35*a*. The communication device 10*a* according to the second embodiment is different from the communication device 10*a* according to the first embodiment in that the communication device 10*a* is configured to further include the determiner 31*a*, the notifier 32*a*, the changer 33*a*, the classical key exchanger 34*a*, and the communication controller 35*a*.

The description of the storage 11*a*, the allocator 12*a*, the encryption processor 13*a*, the receiver 14*a*, the storage controller 15*a*, the intra IF 17*a*, the forwarder 16*a*, and the external I/F 19*a* according to the second embodiment is the same as the description of the storage 11*a*, the allocator 12*a*, the encryption processor 13*a*, the receiver 14*a*, the storage controller 15*a*, the intra I/F 17*a*, the forwarder 16*a*, and the external I/F 19*a* according to the first embodiment, and thus, the description thereof will be omitted.

The UI 16*a* receives an input by the user. The UI 16*a* receives an input indicating, for example, the setting of the communication device 10*a*.

Example of Setting of Communication Device

FIG. 11 is a diagram illustrating an example of setting of the communication device 10 according to the second embodiment. The description of commands of Lines 1 to 7 is the same as that of the example of the setting of the communication device 10 according to the first embodiment (refer to Lines 1 to 7 in FIG. 5), and thus, the description thereof will be omitted. The description of commands of Lines 13 and 14 is the same as that of the example of the setting of the communication device 10 according to the first embodiment (refer to Lines 8 and 9 in FIG. 5), and thus, the description thereof will be omitted.

The commands of Lines 8 to 12 are commands to set the operations of the communication device 10*a* in a case where the update frequency of the shared key is decreased down to an expected value or less (the interval is widened until the shared key is updated). In addition, although the input of the command of Lines 8 to 12 may be omitted, in that case, the operations of the communication device 10 according to the second embodiment are the same as the operations of the communication device 10 according to the first embodiment.

In Line 8, "set notification threshold lifetime seconds 60" is a command to set to perform alarm notification to a predetermined destination in a case where the update interval of the shared key is equal to or larger than the designated interval 60 seconds). In addition, detailed setting (for example, alarm type, mail address, or the like) of the alarm notification is separately performed. In addition, the alarm notification may be performed by using sound such as beep sound output from the communication device 10.

In Line 9, "set fall-down threshold lifetime seconds 120" is a command to set to change (fall down) the updating of the shared key through the quantum key distribution system to the updating of the shared key through other cryptosystems in a case where the update interval of the shared key is equal to or larger than the designated interval (herein, 120 seconds). Other cryptosystems are classical key exchange systems such as RSA and Diffie-Hellman (DH).

In Line 10, "set fall-down transform-set falldown-transform" is a command to specifically define other cryptosystems to be changed from the quantum key distribution system. The detail of the other cryptosystems (falldown-transform) are separately set.

In Line 11, "set disable threshold lifetime seconds 600" is a command to perform setting of stopping the communication of the interface (communication channel) in a case where the update interval of the shared key is equal to or larger than the designated interval (herein, 600 seconds).

Any one of the commands of Lines 8, 9, and 11 is set to be associated with a threshold value indicating the lower limit of the update frequency of the shared key. The commands of Lines 8, 9, and 11 may be individually set, or the commands may be simultaneously set as illustrated in FIG. 11. For example, when the manager of the communication device 10 performs only the setting of the command of Line 8, and the manager receives an alarm notification corresponding to the setting, the manager itself may determines whether or not to stop the interface.

In addition, an operation that becomes effective by setting of the commands of Lines 8, 9, and 11 may become effective by setting of a single command.

In Line 12, "set maximum threshold lifetime seconds 0.01" is a command to set a threshold value indicating an upper limit (in this example, 0.01 seconds) of the update frequency of the shared key. In a case where the command of Line 12 is set, although the shared key can be updated at a frequency which is equal to or larger than a designated upper limit (at a short time interval which is equal to or larger than the designated upper limit), the encryption processor 13*a* does not update the shared key at the frequency which is equal to or larger than the designated upper limit.

Theoretically, since it is considered that, the shorter the update frequency of t e shared key is, the higher the security is, it may be considered that it is not meaningful to set the upper limit of the update frequency of the shared key. However, the shared key updating process consumes the resources of the communication device 10*a*.

The load of the resource is, for example, the above-described key distillation process by a device such as a CPU (Central Processing Unit). In addition, for example, the load of the resource is a transmission/reception process for the above-described control data which is performed in the key distillation process by the communication device 10*a* (or the generation device 20*a*).

Since the load of resources may be overhead, for example, if the encryption processor 13*a* updates the shared key more frequently than necessary despite the security being secured, it is considered that the communication throughput of the communication device 10*a* is likely to be temporarily decreased. Therefore, it is necessary to set the upper limit of the update frequency of the shared key.

Lower Limit Process for Update Frequency

Returning to FIG. 10, for each communication channel to which the setting by the command are applied, the determiner 31a determines whether or not the update frequency of the shared key is equal to or smaller than a threshold value (lower limit) determined for each of the above-described commands (refer to Lines 8, 9, and 11 in FIG. 11).

Operation According to Setting by Command of Line 6 in FIG. 11

In a case where the update frequency of the shared key is equal to or smaller than the threshold value determined for each of the communication channels, the notifier 32a notifies a predetermined destination that the update frequency of the shared key is equal to or smaller than the threshold value determined for each of the communication channels. The predetermined destination is, for example, a mail address of a manager of the communication device 10a, a transmission destination address of an SNMP message, a transmission destination address of a log message, and the like. Therefore, for example, the manager of the communication device 10a can be notified (warned) about the possibility of deterioration in security of the communication device 10a.

Operation According to Setting by Commands of Lines 9 and 10 in FIG. 11

The changer 33a changes the cryptosystem of the communication channel of which the update frequency of the shared key is equal to or smaller than the threshold value to another cryptosystem determined in advance. Another cryptosystem determined in advance is the cryptosystem designated by the command of Line 10 in FIG. 11 described above.

The classical key exchanger 34a generates a classical key used for encrypting data in a communication channel of which the update frequency of the shared key is equal to or smaller than a threshold value by a classical key exchange system such as RSA. The classical key exchanger 34a inputs the classical key to the encryption processor 13a. Accordingly, since the encryption processor 13a can use the classical key that does not depend on the quantum key distribution, it is possible to prevent reduction in key exchange frequency.

In addition, the classical key exchanger 34a may generate a predetermined number of classical keys in advance according to a classical key exchange system such as RSA and retain the classical keys in the storage 11a Operation According to Setting by Command of Line 11 in FIG. 11

The communication controller 35a controls communication of the communication channel. The communication controller 35a prevents communication of which security is likely to be deteriorated, for example, by stopping the communication of the communication channel of which the update frequency of the shared key is equal to or smaller than the threshold value.

Upper Limit Process for Update Frequency

In addition, the determiner 31a determines whether or not the update frequency of the shared key is equal to or larger than the threshold value (upper limit) determined by the above-described command (refer to Line 12 in FIG. 11) for each communication channel to which the setting by the command is applied.

In a case where the update frequency of the shared key is equal to or larger than the threshold value indicating the upper limit determined by the command (refer to Line 12 in FIG. 11), the encryption processor 13a pauses the updating of the shared key of the communication channel to which the setting by the command is applied for a predetermined period. The predetermined period is determined by the encryption processor 13a, for example, according to an amount exceeding the threshold value.

The descriptions of the determiner 31b, the notifier 32b, the changer 33b, the classical key exchanger 34b, and the communication controller 35b is the same as that of the determiner 31a, the notifier 32a, the changer 33a, the classical key exchanger 34a and the communication controller 35a, and thus, the description thereof will be omitted.

As described above, according to the communication device 10 according to the second embodiment, in a case where there is a communication channel of which the update frequency of the shared key is decreased down to an expected value or less, alarm notification, change of the cryptosystem, stop of communication, or the like may be performed. Accordingly, even in a case where there is a communication channel of which the update frequency of the shared key is decreased down to an expected value or less, the operations of the communication device 10 can be appropriately operated according to the setting.

Third Embodiment

Next, a third embodiment will be described. In the description of the third embodiment, the same description as that of the first embodiment will be omitted, and differences from the first embodiment will be described.

In the communication system 100 according to the first embodiment described above, the case the communication device 10a and the communication device 10b communicate with each other has been described. However, the communication system 100 may be configured to include a plurality of three or more communication devices 10.

Figure 12:
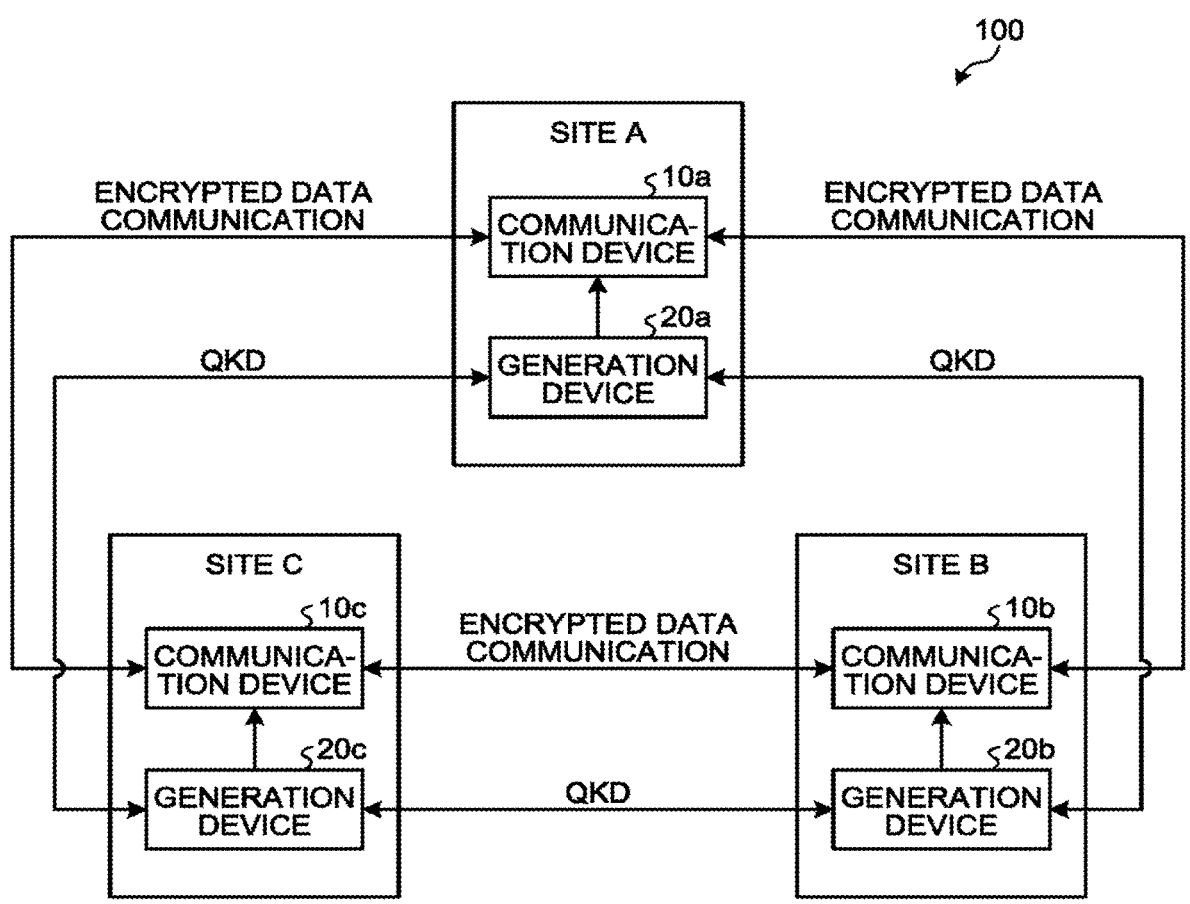
FIG. 12 is a diagram illustrating an example of a device configuration of a communication system according to a third embodiment.

FIG. 12 is a diagram illustrating an example of a device configuration of a communication system 100 according to the third embodiment. The example in FIG. 12 illustrates a case where encrypted data are transmitted and received among a communication device 10a at a site A, a communication device 10b at a site B, and a communication device 10c at a site C. In this case, for example, an allocator 12 allocates a communication channel for each communication device 10.

The description of the communication devices 10a to 10c and the generation devices 20a to 20c is the same as the description of the first embodiment, and thus, the description thereof will be omitted.

According to the communication system 100 of the third embodiment, it is possible to efficiently allocate a shared key that is continuously generated at a varying speed even in 1:N cryptographic communication (N is a plural number), while synchronizing with a communication destination device to a plurality of channels.

Hardware Configuration of Communication System

Finally, an example of a hardware configuration of the communication system 100 according to the first to third embodiments will be described.

Hardware Configuration of Communication Device

Figure 13:
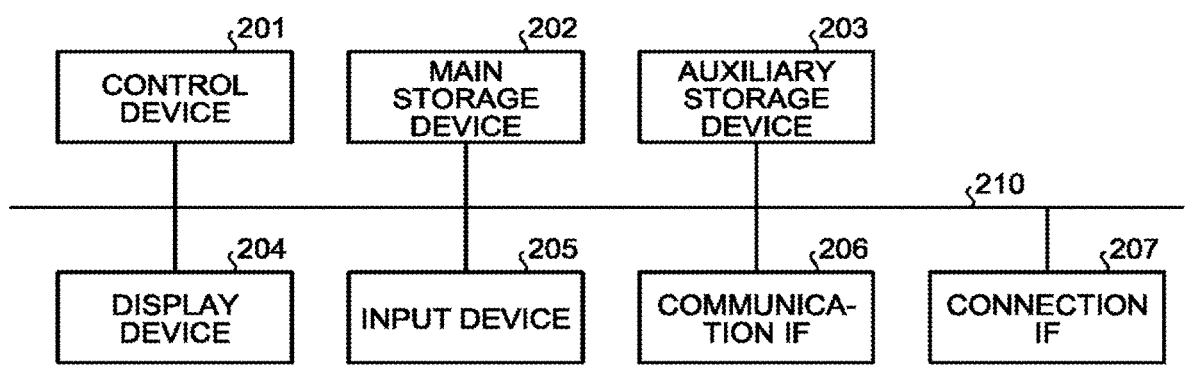
FIG. 13 is a diagram illustrating an example of a hardware configuration of the communication device according to the first to third embodiments.

FIG. 13 is a diagram illustrating an example of a hardware configuration of the communication device 10 according to the embodiment. The communication device 10 according to the embodiment is configured to include a control device 201, a main storage device 202, an auxiliary storage device 203, a display device 204, an input device 205, a communication IF 206, and a connection IF 207. The control device 201, the main storage device 202, the auxiliary storage device 203, the display device 204, the input device 205, the communication IF 206, and the connection IF 207 are connected via a bus 210.

The control device 201 executes a program read from the auxiliary storage device 203 to the main storage device 202. The main storage device 202 is a memory such as a ROM (Read Only Memory) and a R (Random Access Memory). The auxiliary storage device 203 is a memory card, an HDD (Hard Disk Drive), or the like.

The display device 204 displays information. The display device 204 is, for example, a liquid crystal display. The input device 205 receives an input of information. The input device 205 is, for example, a keyboard, a mouse, or the like. In addition, the display device 204 and the input device 205 may be a liquid crystal touch panel or the like that also serves as a display function and an input function.

The communication IF 206 performs encrypted data communication with another communication device 10. The connection IF 207 is connected to the generation device 20. For example, the connection IF 207 receives the shared key from the generation device 20.

The program executed by the communication device 10 according to the embodiment is stored in a computer-readable storage medium such as a CD-ROM, a memory card, a CD-R, and a digital versatile disk (DVD) in a file in an installable format or an executable format to be provided as a computer program product.

In addition, the program executed by the communication device 10 according to the embodiment may be configured to be stored on a computer connected to a network such as the Internet so as to be provided by being downloaded via the network. In addition, the program executed by the communication device 10 according to the embodiment may be configured to be provided via the network such as the Internet without downloading.

In addition, the program executed by the communication device 10 according to the embodiment may be configured to be provided by being incorporated into a ROM or the like in advance.

The program executed by the communication device 10 according to the embodiment has a module configuration including functions realizable by a program among the functional configurations of the communication device 10 according to the above embodiment.

The functions realized by the program are loaded into the main storage device 202 by the control device 201 reading and executing the program from the storage medium such as the auxiliary storage device 203. Namely, the functions realized by the program are generated on the main storage device 202.

Some or all of the functions of the communication device 10 according to the embodiment may be realized by hardware such as an integrated circuit (IC).

Hardware Configuration of Generation Device

Figure 14:
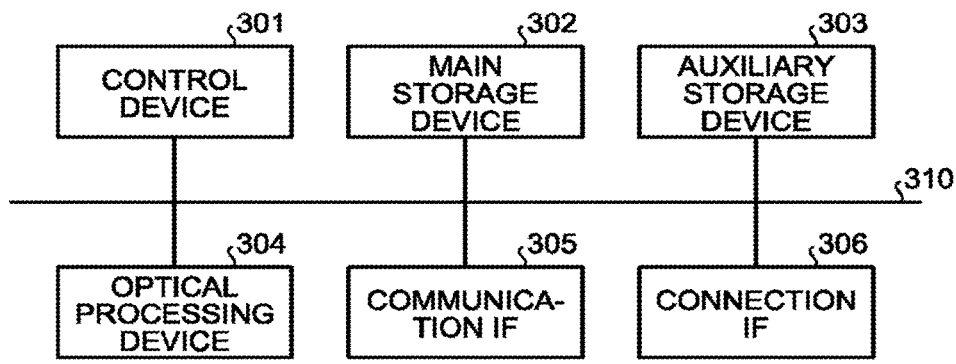
FIG. 14 is a diagram illustrating an example of a hardware configuration of the communication device according to the first to third embodiments.

FIG. 14 is a diagram illustrating an example of a hardware configuration of the generation device 20 according to the embodiment. The generation device 20 according to the embodiment is configured to include a control device 301, a main storage device 302, an auxiliary storage device 303, an optical processing device 304, a communication IF 305, and a connection IF 306. The control device 301, the main storage device 302, the auxiliary storage device 303, the optical processing device 304, the communication IF 305, and the connection IF 306 are connected via a bus 310.

The description of the control device 301, the main storage device 302, and the auxiliary storage device 303 is the same as the description of the control device 201, the main storage device 202 and the auxiliary storage device 203, and thus, the description thereof will be omitted (refer to FIG. 1).

The optical processing device 304 transmits or receives the above-described single photons through the above-described quantum communication path 101. The communication IF 305 communicates with another generation device 20 through the above-described classical communication path 102. The connection IF 306 is connected the communication device 10. The connection IF 306, for example, transmits the shared key to the communication device 10.

The program executed by the generation device 20 according to the embodiment is stored in a computer-readable storage medium such as a CD-ROM, a memory card, a CD-R, and a DVD in a file in an installable format or an executable format to be provided as a computer program product.

In addition, the program executed by the generation device 20 according to the embodiment may be configured to be stored on a computer connected to a network such as the Internet so as to be provided by being downloaded via the network. In addition, the program executed by the generation device 20 according to the embodiment may be configured to be provided via the network such as the Internet without downloading.

In addition, the program executed by the generation device 20 according to the embodiment may be configured to be provided by being incorporated into a ROM or the like in advance.

The program executed by the generation device 20 according to the embodiment has a module configuration including functions realizable by a program among the functional configurations of the generation device 20 according to the above embodiment.

The functions realized by the program are loaded into the main storage device 302 by the control device 301 reading and executing the program from the storage medium such as the auxiliary storage device 303. Namely, the functions realized by the program are generated on the main storage device 302.

Some or all of the functions of the generation device 20 according to the embodiment may be realized by hardware such as an IC.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device comprising:
   a storage having a predetermined number of storage areas configured to store one or more shared keys shared with a communication destination device; and
   one or more hardware processors coupled to the storage and configured to function as:
   a receiver configured to receive a shared key;
   a storage controller configured to store the received shared key in any one of the storage areas every time the shared key is received;
   an interface configured to receive an input designating, for each of a plurality of communication channels used for communicating encrypted data between the communication device and the communication destination device, a ratio at which the communication channel uses the one or more shared keys stored and an input designating an update frequency of a shared key used for encrypting data or decrypting the encrypted data for each of the communication channels;

an allocator configured to allocate the storage areas to the communication channels based on the ratio designated by the input so that the communication channel uses the one or more shared keys at the ratio; and an encryption processor configured to, according to a cryptosystem determined for each of the communication channels, encrypt data and decrypt the encrypted data by using the shared key acquired from the storage area allocated to each of the communication channels and configured to update the shared key of each of the communication channels used for encrypting the data or decrypting the encrypted data at the update frequency designated by the input, wherein the communication channels are connection ports, Transmission Control Protocol (TCP) connections, or wavelengths allocated for communication, wherein the communication device is connected to a generation device generating the shared key by using quantum key distribution, and the receiver receives the shared key from the generation device.

2. The device according to claim 1, wherein the encryption processor acquires the shared key from the storage area allocated to the communication channel and updates the shared key used for encrypting the data or decrypting the encrypted data with the acquired shared key.

3. The device according to claim 2, the one or more hardware processors further comprising a notifier configured to notify that, when the update frequency of the shared key is equal to or smaller than a threshold value determined for each of the communication channels, the update frequency is equal to or smaller than the threshold value.

4. The device according to claim 2, the one or more hardware processors further comprising a changer configured to change a cryptosystem of the communication channel in which the update frequency of the shared key is equal to or smaller than the threshold value, to another cryptosystem.

5. The device according to claim 2, the one or more hardware processors further comprising a communication controller configured to stop communication of the communication channel in which the update frequency of the shared key is equal to or smaller than the threshold value.

6. The device according to claim 1, wherein the predetermined number is a number determined independently of the number of communication channels, the number of communication hardware interfaces of the communication device, and a communication speed of the communication device.

7. The device according to claim 1, wherein the encryption processor acquires the shared key from the storage area allocated to the communication channel every time the shared key is stored in the storage area allocated to the communication channel, and updates the shared key used for encrypting the data or decrypting the encrypted data with the acquired shared key.

8. The device according to claim 1, wherein the encryption processor acquires the shared key from the storage area allocated to the communication channel at an interval according to a speed of reception of the shared key by the receiver and the ratio for the communication channel, and updates the shared key used for encrypting the data or decrypting the encrypted data with the acquired shared key.

9. A communication system comprising a plurality of communication devices, each comprising:

a storage having a predetermined number of storage areas configured to store one or more shared keys shared with a communication destination device;

one or more hardware processors coupled to the storage and configured to function as:

a receiver configured to receive a shared key;

a storage controller configured to store the received shared key in any one of the storage areas every time the shared key is received;

an interface configured to receive an input designating, for each of a plurality of communication channels used for communicating encrypted data between the communication device and the communication destination device, a ratio at which the communication channel uses the one or more shared keys stored and an input designating an update frequency of a shared key used for encrypting data or decrypting the encrypted data for each of the communication channels;

an allocator configured to allocate the storage areas to the communication channels, based on the ratio designated by the input so that the communication channel uses the one or more shared keys at the ratio; and an encryption processor configured to, according to a cryptosystem determined for each of the communication channels, encrypt data and decrypt the encrypted data by using the shared key acquired from the storage area allocated to each of the communication channels and configured to update the shared key of each of the communication channels used for encrypting the data or decrypting the encrypted data at the update frequency designated by the input, wherein the communication channels are connection ports, Transmission Control Protocol (TCP) connections, or wavelengths allocated for communication, wherein the communication devices are connected to a generation device generating the shared key by using quantum key distribution, and the receiver receives the shared key from the generation device.

10. A communication method performed by a communication device that includes a predetermined number of storage areas configured to store one or more shared keys shared with a communication destination device, the method comprising:

receiving a shared key;

storing the received shared key in any one of the storage areas every time the shared key is received;

receiving an input designating, for each of a plurality of communication channels used for communicating encrypted data between the communication device and the communication destination device, a ratio at which the communication channel uses the one or more shared keys stored, and an input designating an update frequency of a shared key used for encrypting data or decrypting the encrypted data for each of the communication channels;

allocating the storage areas to the communication channels based on the ratio designated by the input so that the communication channel uses the one or more shared keys at the ratio; and according to a cryptosystem determined for each of the communication channels, encrypting data and decrypting the encrypted data by using the shared key acquired from the storage area allocated to each of the communication channels and updating the shared key of each of the communication channels used for encrypting the data or decrypting the encrypted data at the update frequency designated by the input, wherein the communication channels are connection ports, Transmission Control Protocol (TCP) connections, or wavelengths allocated for communication, wherein the shared key is generated by using quantum key distribution, and a receiver receives the generated shared key.

\* \* \* \* \*